E. LANGEN.

Mold for the Manufacture of Hard Sugar.

No. 8,642. Reissued April 1, 1879.

Witnesses:

Geo. H. Miatt

Edwd Payson

Inventor

Eugen Langen

Per Edw. E. Lemcke

Atty.

N. PETERS, PHOTO-LITHOGRAPHER, WASHINGTON, D. C.

UNITED STATES PATENT OFFICE.

EUGEN LANGEN, OF COLOGNE, PRUSSIA.

IMPROVEMENT IN MOLDS FOR THE MANUFACTURE OF HARD SUGAR.

Specification forming part of Letters Patent No. 151,604, dated June 2, 1874; Reissue No. 8,642, dated April 1, 1879; application filed October 12, 1878.

*To all whom it may concern:*

Be it known that I, EUGEN LANGEN, of Cologne, Prussia, have invented a certain Improvement in Molds for the Manufacture of Hard Sugar, of which the following is a specification:

This invention is an improvement upon the mold described in Letters Patent No. 134,682, issued to me January 7, 1873, for an improvement in the manufacture of loaf or hard sugar, and in which the sugar mass, while in the molds, was subjected alternately to the action of a centrifugal machine and to that of the claying-liquor in a vacuum-tank; but the invention is more particularly designed to be used in the process described in Letters Patent of the United States No. 151,602, granted to me June 2, 1874, in which process the claying-liquor is forced upward through the mass in the molds without the aid of atmospheric pressure, the molds having their smallest faces downward, the expulsion of the green sirup, and afterward the expulsion of the claying-liquor, being effected by centrifugal action, the same molds being used throughout these several separate operations, and such molds being those into which the sugar mass is run from the vacuum-pans, and allowed to crystallize and cool.

This improved mold, like that described in my Patent No. 134,682, hereinbefore referred to, is transversely of segmental form, with a movable bottom held in place by clamps, or, in other words, is of a tapering internally-truncated shape, open on its opposite faces or sides, and has a removable lid or bottom, with an intervening packing applied to the larger of such open faces; but it is differently constructed from my previous mold in respect of having its lid or cover provided with inclines running in reverse directions relatively to the length of the mold over opposite margins of the latter, whereby increased facility is afforded for securing and removing the removable lid or bottom, and for so equalizing the pressure or strain as to insure a close joint when the lid is on the mold, and in respect of being provided with movable partitions, which divide it into separate compartments.

Figure 1:
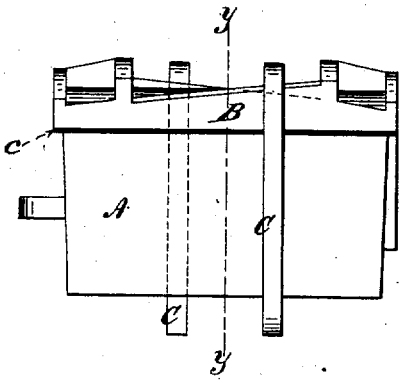
Figure 2:
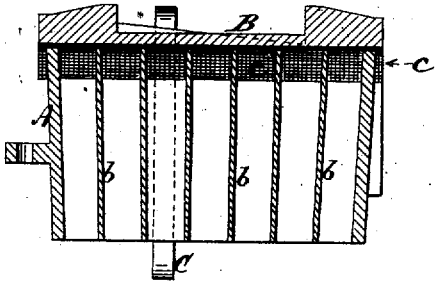
Figure 3:
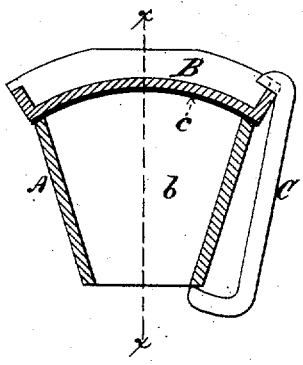
Figure 4:
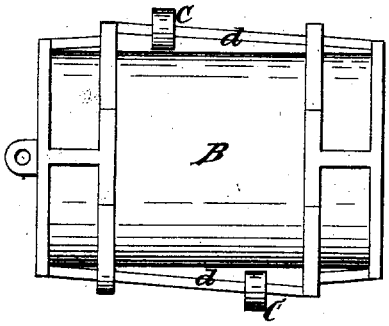

In the accompanying drawings, Figure 1 represents a side view of a mold constructed in accordance with my invention. Fig. 2 is a central longitudinal section of the same on the line *x x*, Fig. 3; Fig. 3, a transverse vertical section thereof on the line *y y*, Fig. 1; and Fig. 4, an outside face view from the lid side of the mold.

Similar letters of reference indicate corresponding parts.

A is the body or frame of the mold, made tapering on its sides or sides and ends, and of sector-like or inner truncated-sector shape in its transverse section, so that a number of these frames placed on end and side by side will form an inner circular wall to a centrifugal drum or machine. Into these frames, by means of grooves or suitable projections, may be fitted loose plates *b*, to divide the frame in sundry compartments, for the purpose of separating the sugar mass into slabs. The smaller inner face of said frame and larger curved outer face thereof are both left open, and after the frame has been fitted with its plates *b*, as described, an india-rubber, canvas, or other suitable packing, *c*, is placed over the curved and larger open face of the mold, and a removable lid or cover, B, fitted thereon and held, to form a close joint with the body of the frame or mold, by means of two or more clamp-hooks, C, on opposite sides of the mold, and arranged to bear on the edges of the smaller open face of the mold and on inclines *d*, made upon the exterior of the lid, on its opposite sides, and inclining in reverse directions relatively to the length of the mold, so that on tightening up the clamp-hooks by driving them along the mold in reverse directions on opposite sides the lids B will not only be firmly held to their places, but the pressure or strain be equally divided on opposite sides of the mold.

The mold is closed by the lid or cover when the sugar mass is first run into it from the vacuum-pans; but said lid is removed when treating the sugar mass within the molds to purging or draining action in the centrifugal machine, also when cleansing the sugar mass in the molds by forcing the claying-liquor up through it, with the largest faces of the molds uppermost, but the lids not being removed when claying by the vacuum process described in my Patent No. 134,682, when the position of the molds is reversed—that is, their smallest faces uppermost.

I claim—

1. An internally-tapering truncated sector-shaped mold or frame, open on opposite sides, as described, in combination with a lid applied to its larger curved outer side or face, and provided with inclines running in reverse directions relatively to the length of the mold, for securing the lid by clamp-hooks applied to the sides of the mold, substantially as specified.

2. The internally-tapering mold A, provided with the parallel plates *b*, for the purpose of separating the sugar mass and facilitating the manufacture of the same in the form of slabs, substantially as described.

EUGEN LANGEN.

Witnesses:
HERMANN POHLMANN,
JACOB EICK.